United States Patent [19]

Sherman

[11] Patent Number: 4,483,769
[45] Date of Patent: Nov. 20, 1984

[54] FILTER CARTRIDGE

[75] Inventor: Robert M. Sherman, Granada Hills, Calif.

[73] Assignee: Aquaria, Inc., Chatsworth, Calif.

[21] Appl. No.: 457,760

[22] Filed: Jan. 13, 1983

[51] Int. Cl.³ .............................................. B01D 25/06
[52] U.S. Cl. .................................... 210/282; 55/484; 55/515; 210/284; 210/484
[58] Field of Search .............................. 210/282–284, 210/484, 485, 498; 55/484, 512, 515–519

[56] References Cited

U.S. PATENT DOCUMENTS

| | | | |
|---|---|---|---|
| 2,605,901 | 8/1952 | Morrison et al. | 210/283 |
| 3,190,059 | 6/1965 | Bauder et al. | 55/517 |
| 3,386,231 | 6/1968 | Nutting | 55/484 |
| 3,897,339 | 7/1975 | Arndt | 210/284 |

Primary Examiner—Ivars Cintins
Attorney, Agent, or Firm—Spensley Horn Jubas & Lubitz

[57] ABSTRACT

A filter cartridge for use with liquids or gases which includes a back structure having a plurality of channels formed in it and filtration granules contained within the channels. Each of the channels includes a plurality of holes to enable water to pass through the back structure. A filter element is secured to the front of the back structure to cover the channels. The provision of the channels enables a uniform distribution of filtration granules to be maintained throughout the filter cartridge.

11 Claims, 6 Drawing Figures

U.S. Patent  Nov. 20, 1984  4,483,769
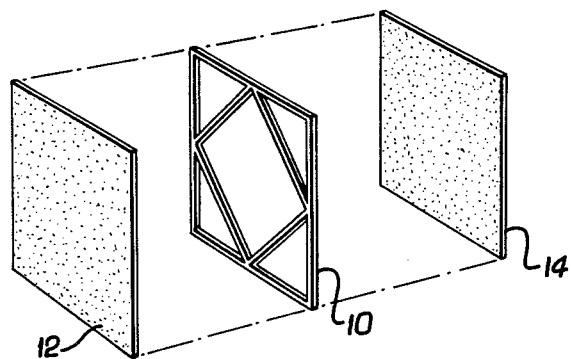
Fig. 1
PRIOR ART
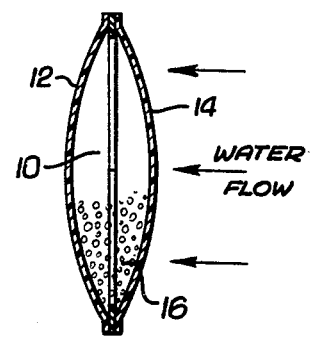
Fig. 2
PRIOR ART
Fig. 3
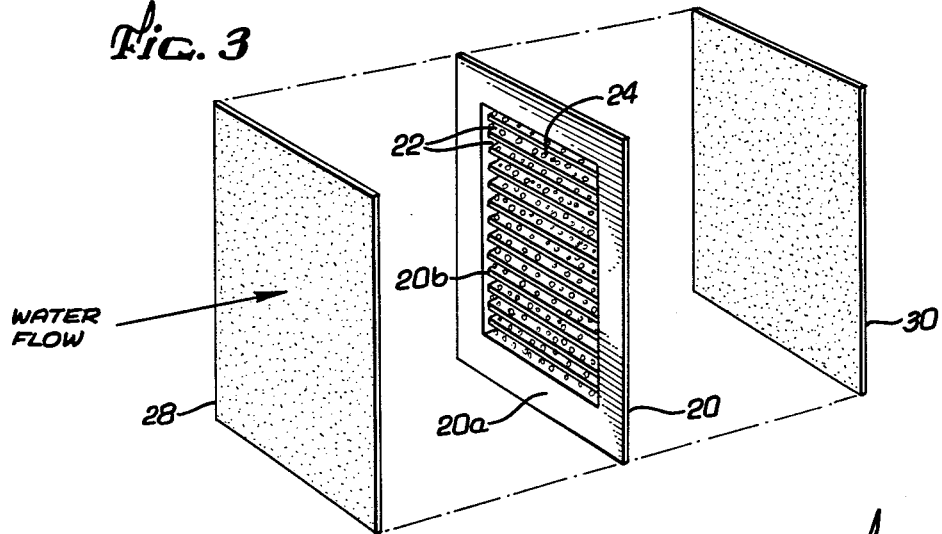
Fig. 4
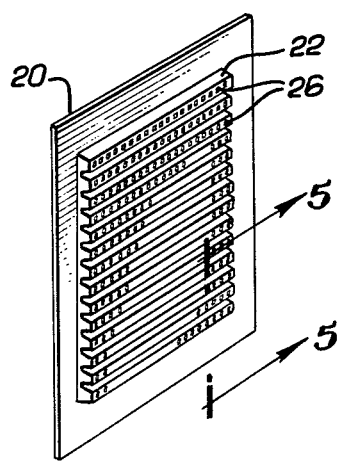
Fig. 5
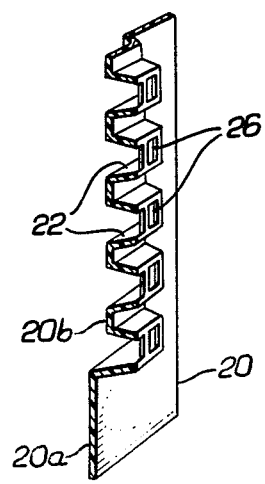
Fig. 6
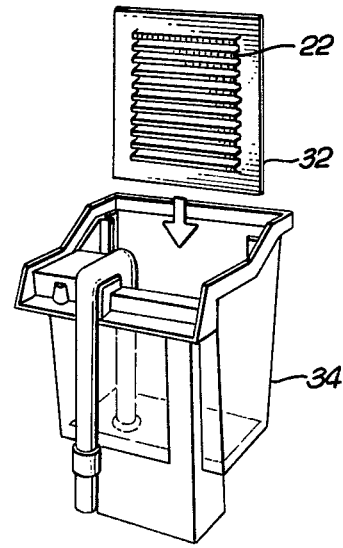

FILTER CARTRIDGE

BACKGROUND OF THE INVENTION

1. Field of the Invention

This invention relates to a filter device, and more particularly to a filter cartridge which is used in a liquid or gas filter. Still more particularly, the present invention relates to a filter cartridge which employs granulated material such as activated carbon as a filtering material. Such filters are typically used with aquariums.

2. Description of the Prior Art

A prior art filter cartridge is illustrated in FIGS. 1 and 2. Such filter includes a central plastic stiffener 10 to which is attached a pair of porous filter elements 12 and 14. Typically, the filter elements are secured to the periphery of the stiffener by means of heat, sonic, radiowave, chemical, or mechanical attachment. The stiffener serves to maintain the shape of the filter elements.

In order to increase filtration efficiency, granules 16 of filter media, such as activated carbon, are carried within the space between the filter elements 12 and 14. In use, the filter cartridge is maintained in a vertical or semi-vertical orientation. Because of the relative flexibility of the filter elements 12 and 14, the granules tend to fall toward the bottom of the filter cartridge as illustrated in FIG. 2. Water passing through the upper portion of the cartridge thus does not receive any granular filtration and overall filtration efficiency is reduced.

The manufacturing process for the prior art structure is a three step procedure which involves initially attaching one of the filter elements to the stiffener, subsequently spreading carbon granules over the surface of the filter element (while maintaining the element horizontal), and finally attaching the second filter element to the stiffener to thereby secure the carbon between the two filter elements.

SUMMARY OF THE INVENTION

It is an object of the present invention to provide a filter cartridge in which an even distribution of granules of filtering material is maintained throughout the cartridge. A further object of the invention is to provide such even distribution without requiring any additional filter material. Yet another object of the invention is to provide a filter cartridge which is simpler to produce, and therefore less expensive, than prior art cartridges.

These and other objects are achieved by providing a filter cartridge which includes a substantially planar back structure having a plurality of pockets formed in it to hold the granules of filter material in a relatively fixed position. The back structure is perforated to allow water to pass through it, and a single filter element is secured to the back frame to cover the pockets and retain the granules. In a preferred embodiment of the invention, the pockets are elongated channels which are filled with carbon granules. The filter element covers the channels and a uniform distribution of carbon granules is maintained despite the fact that the filter cartridge is operated on one edge.

In addition to improved filtration efficiency, the filter cartridge of the present invention reduces the number of steps required to manufacture the cartridge, thereby reducing the cost of the cartridge. The back structure is self-supporting, and the manufacturing steps simply involve depositing the filtration granules within the channels and securing the filter element to the back structure to cover the channels. The resultant device is thus more effective and more economical than the prior art filter cartridge.

BRIEF DESCRIPTION OF THE DRAWINGS

The invention will now be described with reference to the drawings, in which:

FIG. 1 is an exploded perspective view of a prior art filter cartridge;

FIG. 2 is a side plan view of the prior art cartridge showing carbon granules which are sandwiched between filter elements;

FIG. 3 is a front perspective view of the filter cartridge of the present invention;

FIG. 4 is a rear perspective view of the back frame of the filter cartridge;

FIG. 5 is a perspective view and section of the back frame of the filter cartridge; and FIG. 6 is a perspective view of the filter cartridge and associated aquarium filter.

DESCRIPTION OF THE PREFERRED EMBODIMENT

The following description is of the best presently contemplated mode of carrying out the invention. This description is made for the purposes of illustration and is not to be taken in a limiting sense.

Referring to FIG. 3, the present invention includes a back structure or frame 20 which may be formed, for example, of molded styrene or polypropylene. The back frame is a substantially planar element which includes a peripheral section 20a and a slightly indented central section 20b. A plurality of elongated parallel channels are integrally formed in the back frame 20. Disposed within the channels are filter granules 24 such as activated carbon. Preferably, enough granules are employed to substantially fill each of the channels 22. As shown in FIGS. 4 and 5, each of the channels 22 includes a plurality of openings 26 which enable water to flow through the back frame 20. The openings 26 are smaller than the carbon granules 24 so that the granules cannot pass through them.

A sheet-like filter element 28 which may be made, for example, of spun polyester, nylon or cotton, is secured to the back frame 20 and serves to retain the carbon granules 24 within the channels 22. In the preferred embodiment of the invention, the filter element 28 is secured only at the periphery 20a of the back frame and is attached by means of a heat bonding process. Of course, other methods of attaching the filter element 28 to the back frame 20 could be employed, and the element could be secured to the inner section 20b as well as the periphery 20a. The purpose of the filter element 20a is to filter out large particulate matter from the water passing through it. The granules 24 operate as a fine filter for other pollutants.

With the filter element 28 in place, the granules 24 are maintained within their respective channels 22. The polyester material of the filter element 28 is quite flexible and some of the granules 24 may fall out of their channels; however, the number of granules which are not retained in the channels is relatively small and the overall distribution of granules across the surface of the back frame 20 is maintained very uniform.

If desired, a second filter element 30 may be secured to the back side of the back frame 20. This element will provide some additional filtration. However, most of the large particulate filtration will be provided by the front filter element 28.

In manufacturing, the carbon granules are simply placed into the channels while the back frame 20 is maintained horizontal. The filter element 28 is then secured to the back frame. The inherent stiffness of the back frame 20 renders the manufacturing process for the filter cartridge much simpler than that for the prior art cartridge. Additionally, the cartridge can be made with only one filter element, thereby increasing economy.

Referring to FIG. 6, an assembled cartridge 32 is shown with a typical aquarium filter 34. The cartridge 32 is operated on its edge. Preferably the cartridge is inserted so that the channels 22 run in a horizontal direction. However, if the channels 22 are substantially full with granules, the cartridge can be placed in the filter with the channels 22 being vertical and the uniform distribution of granules will still be maintained.

In summary, the present invention provides a filter cartridge which is both better in performance and lower in cost than the prior art cartridge. The design of the cartridge enables a uniform distribution of carbon granules to be maintained throughout the cartridge.

I claim:

1. A filter device comprising:
   a substantially planar back structure having a plurality of integrally formed pockets opening to a first side thereof, each pocket having one or more openings to enable fluid to flow through the back structure;
   a plurality of granules of filter material disposed in the pockets, wherein the granules are larger than the openings; and
   a porous filter element secured to the first side of the back structure, said filter element covering the pockets and retaining the granules of filter material between the back structure and the filter element, said filter device enabling a substantially uniform distribution of filter material granules to be maintained across the surface of the back structure.

2. A filter device according to claim 1, wherein the pockets are comprised of a plurality of parallel elongated channels, each having a plurality of openings therein.

3. A filter device according to claims 1 or 2, wherein the filter material is carbon.

4. A filter device according to claim 2, wherein the filter element is polyester.

5. A filter device according to claim 4, wherein the filter element is secured to the periphery of the back structure.

6. A filter device according to claim 5, wherein the back structure is plastic.

7. A filter device according to claim 6, wherein the filter element is secured to the back structure by means of heat bonding.

8. A filter device according to claim 1, including a second filter element secured to a second side of the back structure.

9. A filter device comprising:
   a substantially planar plastic back structure;
   a plurality of elongated parallel channels integrally formed on a first side of the back structure, each channel including a plurality of openings to enable fluid to pass through the back structure;
   a plurality of granules of filter material disposed in the channels in a substantially uniform distribution wherein the openings in the channels are configured to prevent the passage of granules therethrough; and
   a porous filter element secured to the back structure to cover the first side of the back structure and retain the granules between the filter element and back structure, said channels serving to maintain a substantially uniform distribution of granules within the filter device.

10. A filter device according to claim 9, wherein each channel is substantially filled with granules, whereby a uniform distribution of granules will be maintained across the surface of the back structure regardless of the orientation of the filter device.

11. A filter device comprising:
    a one piece molded planar back structure including a plurality of integrally formed pockets opening to one side thereof and having perforations therethrough;
    a plurality of granules of filter material disposed within the pockets in a substantially uniform distribution; and
    a porous sheet-like filter element covering the pockets so as to contain the granules.

* * * * *